Patented Mar. 28, 1950

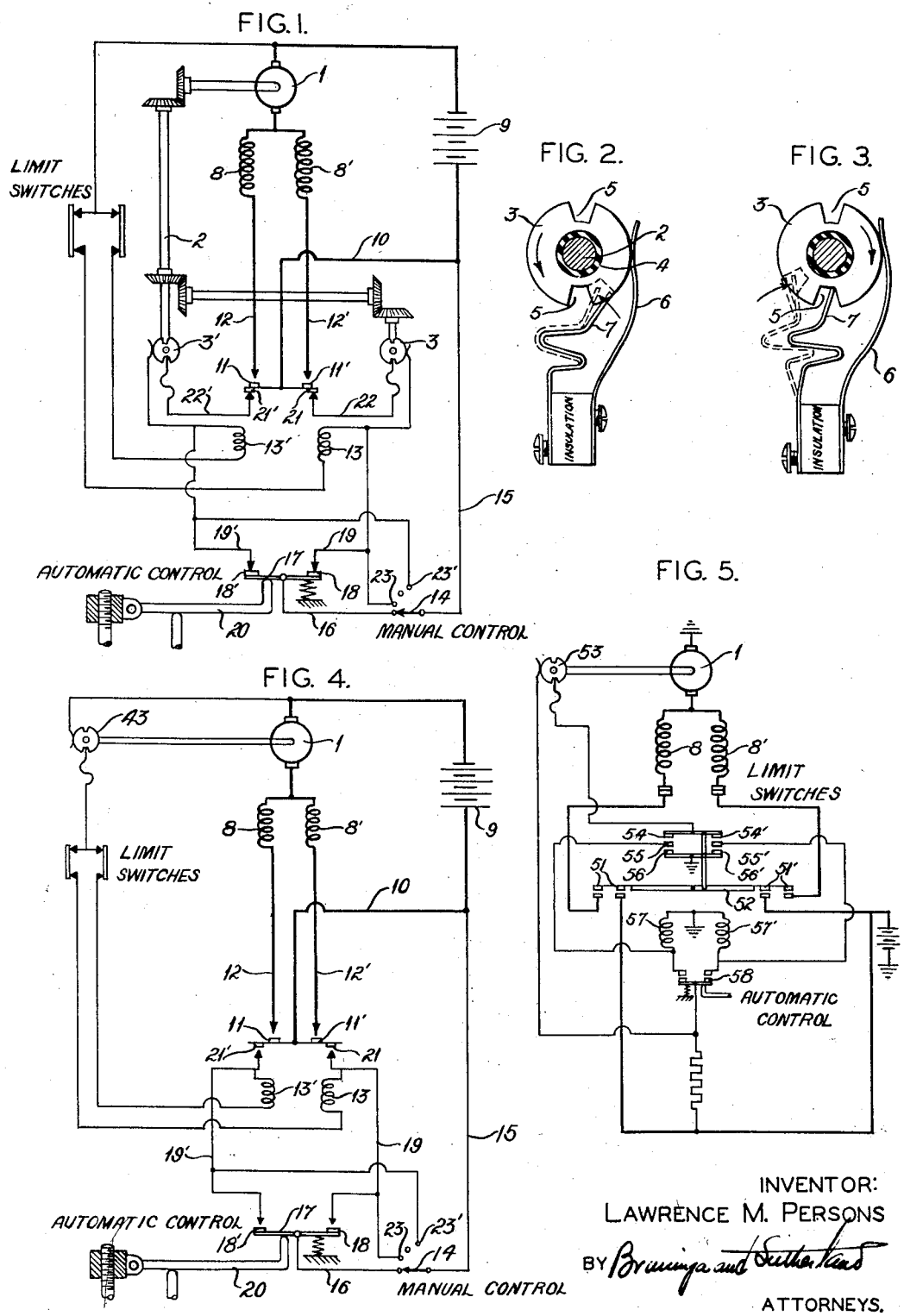

2,502,023

UNITED STATES PATENT OFFICE 2,502,023

HOLDING CIRCUIT CONTROL FOR REVERSIBLE ELECTRIC MOTORS

Lawrence M. Persons, Chesterfield, Mo., assignor to McQuay-Norris Manufacturing Company, St. Louis, Mo., a corporation of Delaware Application November 16, 1946, Serial No. 710,325

6 Claims. (Cl. 318—31)

This invention pertains to control apparatus of the character adapted for controlling reversible electric motors automatically in accordance with variations in quantities such as temperature and pressure. The application is a continuation in part of my co-pending application Serial No. 437,672, filed April 4, 1942, now abandoned.

In control systems for reversible electric motors, such as are employed in the adjustment of the cowl flaps of an aircraft motor and other control dampers automatically in response to variations in circumambient or other temperatures, it usually happens that the temperature-sensitive switch is subject to vibration. In view of the fact that the temperature-sensitive switch must be lightly constructed in order to be sensitive to minute variations in temperature, it is, likewise, sensitive to vibrations of the installation. In situations where the motor is continuously under the control of such a temperature-sensitive switch the vibration of the latter results in frequent interruptions of the movement of the motor, due not to the movement of the switch in response to the desired controlling quantity, but rather due to the undesired movement of the switch incident to the vibration.

The object of the present invention, generally stated, is to provide an automatic control apparatus for aircraft engines and other vibrating installations which is accurate, positive and dependable in its action.

Another object is to provide such a control apparatus in which the temperature or pressure-sensitive switch, though subject to vibration, will not, as an incident to such vibration, interrupt operation of the motor.

Other objects will become apparent to those skilled in the art when the following description is read in connection with the accompanying drawings in which:

Figure 1 is a circuit diagram illustrating the control apparatus of the present invention;

Figures 2 and 3 are enlarged detail views showing, respectively, two different positions of the motor-driven circuit interrupters shown in Figure 1;

Figure 4 is a circuit diagram illustrating another embodiment of the invention; and Figure 5 is a circuit diagram showing still another embodiment of the invention.

In the control system of the present invention, a reversible electric motor is arranged to operate the controlled member, such as the cowl flaps of an aircraft engine, in either of two directions. The direction of operation is controlled by a temperature or pressure-sensitive device operating through an arrangement of switches, interrupters and relays. The present invention is characterized by the feature that the temperature or pressure-sensitive switch, once actuated, is short circuited so that control of the motor is for the time being lost by it. Said short circuit is, however, periodically interrupted during the continued operation of the motor, so that at intervals the sensitive switch regains control of the circuit. The invention is characterized by the further feature that neither the sensitive switch, nor the short circuiting control circuit about it, nor the interrupter in the latter circuit is at any time required to conduct power currents for operation of the motor.

A further important feature of the invention resides in the provision of an interrupter in the control circuit of such character that it will momentarily break the control circuit at least once in each revolution, irrespective of the direction of rotation of the motor, and is so constructed and arranged that, although the motor may stop at the instant the circuit is broken by the interrupter, the latter will immediately restore the circuit.

Referring now to Figures 1, 2 and 3 of the drawings for an illustrative embodiment of the invention, a reversible electric motor 1 is provided for driving a member, such as the cowl flaps of an aircraft engine (not shown), to be controlled. The motor 1 also drives one or more interrupters which may be of the character specifically shown in Figures 2 and 3.

On a shaft 2, driven by the motor 1, a conductor disc 3 is mounted, but separated from the shaft by an insulation sleeve 4, so that during rotation of the motor 1 the disc 3 is continuously rotating. The disc 3 is provided with one or more notches 5. A spring contact 6 is arranged to bear upon the periphery of the disc 3 in such a manner as to ride over notches 5 without losing contact. A second spring contact 7 also bears at its end upon the periphery of disc 3. However, the latter contact 7 is shortened so that its end will drop into the notches 5 as they pass. During this drop, contact between the member 7 and the disc 3 is lost momentarily and the circuit established between the contacts 6 and 7 is open. Accordingly, a circuit depending upon an electrically bridged relation between the contacts 6 and 7 is interrupted momentarily at every passage of one of the notches 5. In Figure 2 the dotted line positions represent the dropping of the contact 7 into the notch 5 as the disc is turning in the counter-clockwise direction. Figure 3, on the other hand, illustrates the relation of the parts when the disc is turning in the clockwise direction.

The spring contact 7 is provided with a double bend, as illustrated, so that upon reversal of the direction of rotation from that shown in Figure 3 to that shown in Figure 2, the end of the contact 7 will drop into the notch, as shown in full lines in Figure 3 in order to resume its position at the 5 o'clock station for rotation in the counterclockwise direction, as shown in Figure 2. During such a reversal of the direction of rotation of the disc, compression of the double bend in the contact 7 takes place.

In the embodiment shown in Figure 1, two such interrupters 3 and 3' are shown.

The reversible motor 1 is provided with field windings 8 and 8' to be energized, respectively, in accordance with the desired direction of rotation of the motor. Power is supplied from a battery 9 through a lead 10 to a magnetic switch having contacts 11 and 11'. Arranged for selective contact with contact 11 is a lead 12 leading to field winding 8, and, similarly, a lead 12' leading to field winding 8' is arranged to selectively contact contact 11'.

The magnetic switch, to which reference has just been made, is actuated to close the circuit between contact 11 and lead 12 upon energization of coil 13 and to close the circuit between contact 11' and lead 12' upon energization of coil 13'.

In order to initiate the energization of the coils 13 and 13' selectively, the invention contemplates either manual or automatic control. In the case of automatic control, the manual switch 14 is moved to the station shown in Figure 1, which completes a circuit from the battery 9 through conductor 15, switch 14, conductor 16, to a sensitive switch 17 having a pair of contacts 18 and 18' selectively engageable with conductors 19 and 19'. It will be understood that the switch 17 is actuated to make contact either at 18 or 18' or to stand open, depending upon the position indicated by the index member 20, which may be a thermally responsive member, a pressure responsive member or responsive to some other controlling quantity. When the index member 20 has moved switch 17 to the position whereat a circuit is completed from contact 18 to conductor 19, the magnetic switch coil 13 is energized. This effects a closure of the circuit between contact 11 and conductor 12, and, at the same time, effects a closure of a holding circuit from auxiliary contact 21 to conductor 22 and through interrupter 3 to coil 13. Once this holding circuit is completed, the sensitive switch 17 may chatter or vibrate without interrupting the flow of current through coil 13, and without interrupting the flow of current through the power circuit to the motor, except, as in the rotation of interrupter 3, a momentary interruption of the holding circuit may coincide with the momentary interruption at switch 17. While the energization of the coil 13 is initiated by a closure of contacts at switch 17, once the magnetic switch is actuated to close contacts 11 and 21, such contacts are free from control by switch 17, until the holding circuit is interrupted by interrupter 3. At the instant of such interruption control of the circuit is restored to the sensitive switch 17.

If, on the other hand, the index member 20 moves to close the circuit from contact 18' to conductor 19', then coil 13' of the magnetic switch is energized to effect a closing of the power circuit across contact 11' and conductor 12' and, concurrently to complete a holding circuit from auxiliary contact 21' through conductor 22', interrupter 3' and coil 13'.

For manual operation of the circuit shown in Figure 1, the switch member 14 is moved to station 23 for energization of coil 13 and motor field winding 8, or to station 23' for energization of coil 13' and motor field winding 8'.

In the embodiment shown in Figure 4, the parts are identical with that shown in Figure 1, save that a single interrupter 43 is provided instead of the two interrupters 3 and 3' shown in Figure 1. In this instance there is a complete interruption of the flow of current through the magnetic switch coil and a complete interruption of the flow of current to the motor upon each interruption at the interrupter 43, but, due to the character of the interrupter, the circuit is immediately restored.

Referring now to Figure 5 for a further embodiment of the invention, the motor 1 drives a single interrupter 53, in addition to the controlled members designed to be driven by it. As in the previous embodiment, the power circuit to the motor is directionally controlled by a magnetic switch 52 having two sets of main contacts 51 and 51' arranged, respectively, to control the circuit to field windings 8 and 8'. The magnetic switch is also provided with auxiliary contact 54 arranged for engagement with a stationary contact 55 when the main contacts 51 are in engagement with their stationary contacts. Likewise, auxiliary contact 54' is arranged for engagement with the stationary contact 55' when the main contacts 51' are in engagement with their stationary contacts. Moreover, a further set of auxiliary contacts 56 and 56' are arranged to engage stationary contacts 55 and 55' selectively, it being understood that the bars carrying contacts 51, 54 and 56 all tilt in the same direction concurrently.

In order to actuate the magnetic switch so as to close main contacts 51, coil 57 is energized. This is accomplished through a sensitive automatic switch 58, as before. Upon initial energization of coil 57, the magnetic switch is closed to complete the power circuit across contacts 51, as well as to complete a holding circuit between contacts 54 and 55. Upon the completion of the latter circuit, which involves short circuiting the switch 58 through interrupter 53, control of the circuit is lost by the sensitive switch 58 and not resumed until a momentary interruption occurs at interrupter 53.

For operation of the motor in the opposite direction, coil 57' of the magnetic switch is energized to complete the power circuit across contacts 51' and concurrently complete a holding circuit across contacts 54' and 55' through interrupter 53.

In situations where the motor 1 may have operated to such extent in one direction (as for example with contacts 51 closed) that the limit switch opens, it will be apparent that, although the motor is disconnected from the source of power, the control circuit remains energized and the holding circuit remains complete, because the interrupter 53 is no longer turning. When, during the prevalence of such a situation, the sensitive switch 58 moves so as to close the opposite circuit both coils of the magnetic switch 57 and 57', would be energized but for the fact of the grounding connection through contacts 56 and 56'. When coil 57 is energized, contact 56' engages contact 55' to ground the side of the sensitive switch 58 which leads to coil 57'. Consequently, when the switch 58 moves to complete the circuit on the side of coil 57' (the circuit through coil 57 standing complete through interrupter 53), a short circuit to ground is produced which deenergizes coil 57 and releases the magnetic switch with concurrent interruption of the short circuit to ground through contacts 55'' and 56' so that coil 57' may now be energized. When the motor is operated to its limit in the opposite direction, the same sequence of operations occurs, but with the opposite contacts.

From the foregoing description, those skilled in the art should readily understand the arrangement and operation of the control apparatus and circuit, and realize that the invention permits the utilization of a highly sensitive automatic control switch without rendering operation of the motor subject to frequent interruption as an incident to the chattering of the contacts at the magnetic switch. Such is accomplished in the embodiments of Figures 1 and 5 by providing a short circuit about the sensitive switch and locating in said short circuit an interrupter which periodically and instantaneously breaks the short circuit during the continued operation of the motor, and thus restores control to the sensitive switch.

It will be understood that, while several embodiments of the circuit have been illustrated, the invention is not limited to the details thereof, nor to the specific type of interrupter employed. It is, therefore, to be distinctly understood that many modifications and variations may be made consistent with the foregoing disclosure and without departing from the spirit of the invention, or of the scope of the appended claims.

Having thus described the invention, what is claimed and desired to be secured by Letters Patent is:

1. Control apparatus of the character described, comprising, a controlled element, reversible electrical operating means therefor, an index member actuated in accordance with variations in the controlling quantity, contact means actuated by said index member to close the circuit of said operating means, a locking circuit paralleling the circuit of said operating means for holding said contact means closed, and means driven by the reversible electrical operating means and operating periodically to momentarily interrupt said locking circuit regardless of the position of the index member, and regardless of the direction of operation of the electrical operating means.

2. Control apparatus of the character described, comprising, a controlled element, reversible electrical operating means therefor, an index member actuated in accordance with variations in the controlling quantity, a relay actuated by said index member to close the circuit of said operating means, a holding circuit for said relay paralleling the circuit of said operating means, energized upon closure of sand circuit to hold the circuit closed, and said holding circuit including means driven by said electrical operating means and operating periodically to de-energize said holding circuit regardless of the direction of operation of said reversible electrical operating means.

3. Control apparatus for a reversible electric motor having a power circuit, a magnetically operated switch having contacts arranged to directionally control energization of said motor from said power circuit, said switch having operating coils connected in a control circuit paralleling said motor irrespective of whether said magnetic switch is open or closed, said control circuit including a switch sensitive to variations in a controlling quantity for selectively initiating energization of said switch operating coils, and a holding circuit shunting said sensitive switch and including an interrupter driven by said motor for periodically breaking the holding circuit during operation of the motor, said holding circuit including contacts associated with said magnetically operated switch and actuated between open and closed positions as said magnetically operated switch moves to make and break the power circuit to said motor.

4. Control apparatus for a reversible electric motor having a power circuit, a magnetically operated switch having contacts arranged to directionally control energization of said motor from said power circuit, said switch having operating coils connected in a control circuit paralleling said motor irrespective of whether said magnetic switch is open or closed, said control circuit including a switch sensitive to variations in a controlling quantity for selectively initiating energization of said switch operating coils, and a holding circuit shunting said sensitive switch and including an interrupter driven by said motor for periodically breaking the holding circuit during operation of the motor, irrespective of the direction of rotation of said motor, said holding circuit including contacts associated with said magnetically operated switch and actuated between open and closed positions as said magnetically operated switch moves to make and break the power circuit to said motor.

5. Control apparatus for a reversible electric motor having a power circuit, a magnetically operated switch having contacts arranged to directionally control energization of said motor from said power circuit and auxiliary contacts arranged to control energization of a holding circuit, said switch having operating coils connected in a control circuit paralleling said motor irrespective of whether said magnetic switch is open or closed, said control circuit including a switch sensitive to variations in a controlling quantity for selectively initiating energization of said switch operating coils; a circuit interrupter consisting of a conductor disc mechanically driven by said motor and a pair of brushes riding the periphery of said disc, one of said brushes connected to the control circuit between the sensitive switch and the coil of the magnetic switch and the other of said brushes connected through said auxiliary contacts to the opposite side of the sensitive switch, said conductor disc having a peripheral indentation proportioned to momentarily break contact with one of said brushes as the indentation passes said brush.

6. Control apparatus for a reversible electric motor having a power circuit, a magnetically operated switch having contacts arranged to directionally control energization of said motor from said power circuit, said switch having operating coils connected in a control circuit paralleling said motor irrespective of whether said magnetic switch is open or closed, said control circuit including a switch sensitive to variations in a controlling quantity for selectively initiating energization of said switch operating coils, a holding circuit shunting said sensitive switch, said holding circuit including contacts associated with said magnetically operated switch and actuated between open and closed positions as said magnetically operated switch moves to make and break the power circuit to said motor, and an interrupter driven by said motor for periodically momentarily interrupting the holding circuit irrespective of the direction of rotation of the motor.

LAWRENCE M. PERSONS.

REFERENCES CITED

The following references are of record in the file of this patent:

UNITED STATES PATENTS

| Number | Name | Date |
| --- | --- | --- |
| 1,783,634 | Tannehill | Dec. 2, 1930 |
| 2,077,086 | Adair | Apr. 13, 1937 |